United States Patent [19]

Buxbaum

[11] 4,108,834

[45] Aug. 22, 1978

[54] THERMOPLASTIC POLYESTERS

[75] Inventor: Lothar Buxbaum, Lindenfels, Odenwald, Germany

[73] Assignee: Ciba-Geigy Corporation, Ardsley, N.Y.

[21] Appl. No.: 801,940

[22] Filed: May 31, 1977

[30] Foreign Application Priority Data

Jun. 11, 1976 [CH] Switzerland ............... 7418/76

[51] Int. Cl.² ............................................. C08G 63/68
[52] U.S. Cl. ............................. 528/289; 260/33.4 P; 260/37 N; 428/261
[58] Field of Search ............. 260/47 CZ, 75 N, 47 C, 260/49

[56] References Cited

U.S. PATENT DOCUMENTS

| | | | |
|---|---|---|---|
| 3,542,731 | 11/1970 | Culbertson | 260/47 |
| 3,763,001 | 10/1973 | Crescenzi et al. | 260/47 CZ |
| 3,910,860 | 10/1975 | Tanikella | 260/76 |
| 3,925,310 | 12/1975 | Wolf et al. | 260/47 CZ |

*Primary Examiner*—Lester L. Lee
*Attorney, Agent, or Firm*—Luther A. R. Hall

[57] ABSTRACT

Thermoplastic polyesters based on aromatic dicarboxylic acids and aromatic diols possess, with high glass transition temperatures and good processing characteristics, improved toughness properties when N,N-heterocyclic diols are concomitantly incorporated by condensation into the polyester.

12 Claims, No Drawings

THERMOPLASTIC POLYESTERS

The present invention relates to linear thermoplastic polyesters formed from aromatic and, optionally, aliphatic dicarboxylic acids, aromatic diols, aliphatic diols containing a heterocyclic ring, and optionally further aliphatic diols; to processes for producing these thermoplastic polyesters and to their use.

Thermoplastic polyesters formed from dicarboxylic acids and aromatic diols are known, e.g. polyesters from aliphatic and/or aromatic dicarboxylic acids and aromatic diols, which can also contain aliphatic diols. They are described, e.g., in the U.S. Pat. Nos. 3,351,624, 3,317,464, 3,297,633, 3,471,441 and 3,398,120 and in the German Offenlegungsschrift No. 2,438,053. A considerable disadvantage of these polyesters is their relatively high combustibility and frequently their difficult processing characteristics by virtue of high softening temperatures and melt viscosities, factors which necessitate processing temperatures which can be at the limit of the thermostability of the polyesters. The last-mentioned applies in particular to polyesters which consist mainly of phthalic acids and bisphenols.

The aim of the present invention is to provide thermoplastic polyesters based on aromatic dicarboxylic acids and aromatic diols, which are less combustible and which at the same time have high glass transition temperatures, particularly above 100° C, with good processing characteristics. Furthermore, the polyesters are to possess good toughness properties.

The subject matter of the present invention are linear thermoplastic polyesters formed from dicarboxylic acids, aromatic diols and aliphatic diols, with a relative viscosity of 1.1 to 3.5 measured on a solution of 1 g of polyester in 100 ml of a solvent at 30° C consisting of equal parts of phenol and symmetrical tetrachloroethane, characterised in that they comprise, relative to the polyester:

a. 35 to 50 mol % of aromatic dicarboxylic acid radicals and 0 to 15 mol % of aliphatic dicarboxylic acid radicals;
b. 25 to 49 mol % of radicals of at least one aromatic diol; and
c. 1 to 25 mol % of at least one radical of a diol of the general formula I

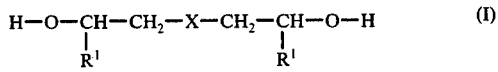

wherein $R^1$ represents a hydrogen atom, methyl, ethyl or phenyl, and X represents a radical of the formulae Ia to If:

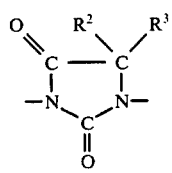

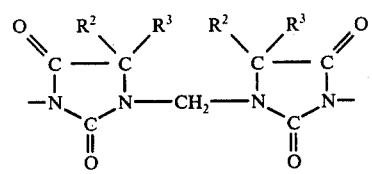

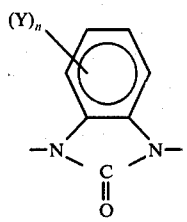

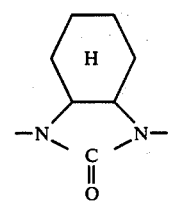

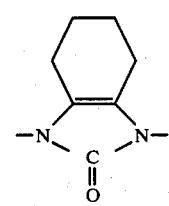

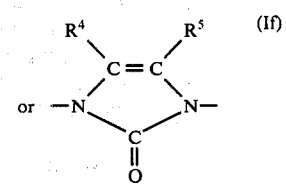

wherein $R^2$ represents a hydrogen atom, methyl or ethyl, $R^3$ represents methyl, ethyl, propyl or isopropyl, $R^4$ and $R^5$ represent phenyl which can be partially or completely chlorinated or brominated, and Y represents a chlorine or bromine atom, and n represents nought or a number from 1 to 4, whereby a portion of up to at most 10 mol % of the diol radicals of the formula I can be replaced by other aliphatic or cycloaliphatic diol radicals.

Preferably they contain 45 to 50 mol % of aromatic dicarboxylic acid radicals and up to 5 mol % of aliphatic dicarboxylic acid radicals as well as 35 to 47.5 mol % of aromatic diol radicals and 2.5 to 15 mol % of radicals of diols of the formula I.

$R^1$ in formula I represents preferably a hydrogen atom and X represents preferably a radical of the formulae Ia to Ic. In the formulae Ia and Ib, $R^2$ preferably represents methyl and $R^3$ methyl or ethyl. In formula Ic, n is preferably 0 or the number 4.

The relative viscosity of the polyesters is preferably 1.3 to 3.0. The polyesters contain aromatic and optionally aliphatic dicarboxylic acids, which are linear or branched.

Suitable aliphatic dicarboxylic acids are those having 4–36 C atoms, e.g. dimethylmalonic acid, succinic acid, octadecylsuccinic acid, pimelic acid, adipic acid, trimethyladipic acid, sebacic acid, azelaic acid and dimeric acids (dimerisation products of unsaturated aliphatic carboxylic acids such as oleic acid). Dimeric acids and alkylsuccinic acids having 6 to 22 C atoms in the alkyl group are preferred.

Suitable aromatic dicarboxylic acids are: terephthalic acid, isophthalic acid, o-phthalic acid, 1,3-, 1,4-, 2,6- or 2,7-naphthalenedicarboxylic acid, 4,4'-diphenyldicarboxylic acid, 4,4'-diphenylsulphonedicarboxylic acid, 1,1,3-trimethyl-5-carboxyl-3-(p-carboxylphenyl)-indane, 4,4'-diphenyl ether dicarboxylic acid and bis-p-(carboxylphenyl)-methane.

The aromatic dicarboxylic acids are preferred: among them in particular terephthalic acid and isophthalic acid.

Among the aromatic diols of the constituent c), there come into consideration mononuclear diphenols and in particular binuclear diphenols, which carry on each aromatic nucleus a hydroxyl group. By 'aromatic' are meant hydrocarbon-aromatic radicals such as phenylene or naphthylene. To be mentioned, besides e.g. hydroquinone, are particularly the bisphenols which can be represented by the following formula:

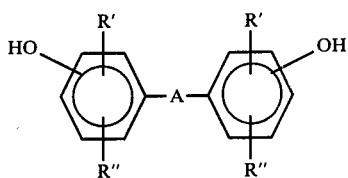

The hydroxyl groups can be in the m-position, especially however in the p-position. In this formula, R' and R" can represent alkyl having 1 to 6 C atoms, halogen such as chlorine or bromine, and particularly hydrogen atoms. The symbol A can represent a direct bond, or O, S, SO$_2$, optionally substituted alkylidene, cycloalkylidene or alkylene.

Examples of optionally substituted alkylidene are: ethylidene, 1,1- or 2,2-propylidene, 2,2-butylidene, 1,1-isobutylidene, pentylidene, hexylidene, heptylidene, octylidene, dichloroethylidene or trichloroethylidene.

Examples of optionally substituted alkylene are: methylene, ethylene, phenylmethylene, diphenylmethylene or methylphenylmethylene.

Examples of cycloalkylidene are: cyclopentylidene, cyclohexylidene, cycloheptylidene and cyclooctylidene.

Examples of bisphenols are:
bis-(p-hydroxyphenyl)-ether or bis-(p-hydroxyphenyl)-thioether,
bis-(p-hydroxyphenyl)-sulphone, bis-(p-hydroxyphenyl)-methane,
1,2-bis-(p-hydroxyphenyl)-ethane, phenyl-bis-(p-hydroxyphenyl)-methane, diphenyl-bis-(p-hydroxyphenyl)-methane, 2,2-bis-(4'-hydroxy-3'-dimethylphenyl)-propane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and, in particular, 2,2-bis-(p-hydroxyphenyl)-propane (bisphenol-A) and 1,1-bis-(p-hydroxyphenyl)-cyclohexane (bisphenol-C).

The diols of the formula I are known and are described, for example, in the German Offenlegungsschriften Nos. 1,812,003, 2,342,432, 2,342,372 and 2,453,326. Examples are: N,N'-bis-(β-hydroxyethyl-5,5-dimethyl)-hydantoin, N,N'-bis-(β-hydroxypropyl-5,5-dimethyl)-hydantoin, methylene-bis-[N,N'-(β-hydroxyethyl)-5-methyl-5-ethylhydantoin], methylene-bis-[N-(β-hydroxyethyl)-5,5-dimethylhydantoin], N,N'-bis-(β-hydroxyethyl)-benzimidazolone, N,N'-bis-(β-hydroxyethyl)-tetrachlorobenzimidazolone or N,N'-bis-(β-hydroxyethyl)-tetrabromobenzimidazolone, N,N'-bis-(β-hydroxypropyl)-dihydrobenzimidazolone and N,N'-bis-(β-hydroxyethyl)-tetrahydrobenzimidazolone.

The polyesters according to the invention can also contain up to 15 mol % of other aliphatic diol radicals.

Suitable aliphatic diols are the aliphatic glycols, particularly those having 2 to 12, especially 2 to 6, carbon atoms in the molecule.

Further suitable aliphatic diols are, e.g.: 1,4-dihydroxymethylcyclohexane, p-xylyene glycol or 2,5-dichloro-p-xylylene glycol, 2,2-(β-hydroxyethoxyphenyl)-propane, as well as polyoxaalkylene glycols such as diethylene glycol, triethylene glycol or polyethylene glycol. The alkylene diols are preferably linear and contain, in particular, 2 to 4 carbon atoms.

Preferred diols are the alkylene diols and 1,4-dihydroxymethylcyclohexane. Ethylene glycol and 1,4-butanediol are particularly preferred.

The polyesters according to the invention can be obtained by a known method comprising polycondensing the dicarboxylic acids, or their polyester-forming derivatives, with at least one aromatic diol, at least one diol of the formula I and, optionally, with a further aliphatic diol until the desired viscosity is obtained. Polycondensation is as a rule performed at temperatures of 0° to 320° C under normal pressure, or in vacuo and/or in a stream of inert gas.

The know methods for producing the new polyesters are, e.g., solution or azeotropic condensation, or interfacial, melt or solid phase condensation, and also combinations of these methods, depending on which polyester-forming derivatives and reaction catalysts are used.

As polyester-forming derivatives of the dicarboxylic acids there are principally used the low-molecular dialkyl esters having 1 to 4 carbon atoms in the molecule, preferably dimethyl esters or diphenyl esters. Also suitable are the acid dihalides, particularly the acid dichlorides.

The polyesters according to the invention can be produced, for example, by esterifying or transesterifying the dicarboxylic acids, or their low-molecular dialkyl esters or diphenyl esters, with aromatic diols, with diols of the formula I and, optionally, with further aliphatic diols, in an inert atmosphere, e.g. in a nitrogen atmosphere, in the presence of catalysts and with the simultaneous removal of the formed water, alkanol or phenol, at 150°–250° C; and subsequently performing the polycondensation at 200° to 320° C under reduced pressure in the presence of specific catalysts until the polycondensates have the desired viscosity. After removal from the reaction vessel and cooling, the polyester melt obtained is granulated or chipped in the usual manner.

As esterification catalysts, it is possible to use in the known manner amines, inorganic or organic acids, e.g. hydrochloric acid or p-toluenesulphonic acid, or alternatively metals or metal compounds, which are also suitable as transesterification catalysts.

Since some catalysts accelerate preferentially the transesterification and others the polycondensation, it is advantageous to use a combination of several catalysts. Suitable transesterification catalysts are, e.g., the oxides, salts or organic compounds of the metals calcium, magnesium, zinc, cadmium, manganese, titanium and cobalt. Also the metals as such can be used as catalysts. The polycondensation is catalysed, for example, by metals such as lead, titanium, germanium and, in particular, antimony or tin, or compounds thereof. These catalysts may be added together or separately to the reaction mixture. They are added in amounts of about 0.001 to 1.0 percent by weight, relative to the acid constituent.

In producing the polyesters according to the invention, there are used particularly advantageously catalysts which accelerate both the transesterification and the polycondensation. Suitable such catalysts are, in particular, mixtures of various metals or metal compounds and also corresponding metal alloys.

A further embodiment of the process for producing the new polyesters comprises polycondensing dihalides of the dicarboxylic acids, preferably the acid dichlorides, with aromatic diols, diols of the formula I and, optionally, together with further aliphatic diols, in the presence of a basic catalyst in the temperature range of 0° to 100° C, with the splitting-off of hydrogen halide. As basic catalysts are preferably used amines or quaternary ammonium salts. The proportion of the basic catalyst can be from 0.1 to 800 mol % and more, preferably 0.1 to 100 mol %, relative to the acid halide. This procedure can be carried out without solvent or in the presence of a solvent. It can be performed in a homogeneous solution of organic solvents, or as interfacial surface condensation in a system water/organic solvent.

Polycondensation can be performed also by firstly condensing the starting compounds in the melt to give a certain viscosity; then granulating the resulting precondensate, e.g. by means of an underwater granulator; drying the granulate; optionally crystallising it with crystallising auxiliaries; and subsequently subjecting it to a solid-phase condensation, with a vacuum and temperatures below the melting point of the granulate being applied. Higher viscosities can be obtained in this manner. Further condensation may also be performed continuously in a double screw extruder under vacuum.

In the processing of the polyester melt or even before the polycondensation reaction, there can be added to the reaction mixture inert additives of all kinds, for example fillers such as kaolin, metal powders, wollastonite, micromica and, in particular, glass fibres, inorganic or organic pigments, optical brighteners, delusterants, internal lubricants, agents promoting crystallisation and flameproofing agents, e.g. antimony trioxide and decabromobiphenyl.

If polycondensation is performed discontinuously, it is possible to add the inert additives already during the last condensation stages, e.g. during the solid-phase condensation, or at the end of the melt condensation.

The polyesters according to the invention can be partially crystalline or they can be amorphous, depending on which diols and which dicarboxylic acids are used as starting constituents and in what quantity ratios these are used. They are colourless to brown-coloured, soluble in organic solvents, and constitute thermoplastic materials (engineering plastics) from which can be produced by customary moulding processes, such as casting, injection moulding and extruding, moulded articles having valuable properties. Examples of such moulded articles are parts for technical apparatus, apparatus housings, domestic equipment, sports equipment, electric insulation, car components, switch gear, sheets, films, and semiproducts which can be shaped by machining. The application for the coating of articles by known powder-coating processes is also possible. Furthermore, the polyesters according to the invention are also suitable as hot melt adhesives, for the production of sintered filters and the manufacture of machine parts by the sinter-forge process.

Particularly advantageous are the surprisingly low softening temperatures of the polyesters according to the invention, which ensure good processing characteristics. In particular, the thermal stress during processing is consequently not too high. A further advantage of the polyesters is their low combustibility and their surprisingly high glass transition temperatures. The toughness properties of the polyesters are excellent, particularly the impact strength is surprisingly good.

The polyesters produced according to the following Examples are more precisely defined by the following characteristic values. The polyesters are characterised by the morphological changes which are measured by means of differential thermoanalysis on a specimen tempered for 3 minutes at 30° C above the melting point or softening point and then rapidly quenched. The quenched specimen is heated at a rate of 16° C/minute by means of the differential scanning calorimeter "DSC-1B," Perkin-Elmer. The thermogram of the specimen shows the glass transition temperature ($T_g$), the crystallisation temperature ($T_k$) and the crystallite melt temperature ($T_m$).

The point of inflection where there occurs a sudden increase in the specific heat in the thermogram is given as the glass transition temperature; the tip of the exothermal peak as the crystallisation temperature; the tip of the endothermic peak as the melting temperature; and the point at which the sudden exo- and endothermic fluctuations of the specific heat commence is given as the decomposition temperature ($T_z$). The relative viscosity of the polycondensates of the Examples is determined on solutions of 1 g of polyester in 100 ml of a mixture which consists of equal parts of phenol and symmetrical tetrachloroethane, at 30° C. The softening temperature ($T_e$) is determined on a hot-stage microscope according to Kofler with a heating-up rate of 15° C/minute, by which system a cross is formed from 2 filaments and the softening temperature is defined as that temperature at which the sharp angles of the cross disappear.

EXAMPLE 1

In a reactor provided with stirrer, $N_2$ inlet and distillation bridge, 12.72 parts by weight of diphenyl terephthalate (DPT), 3.18 parts of diphenyl isophthalate (DPI), 7.99 parts of bisphenol-A, 5.34 parts of 1,1-methylene-bis-[3-(2'-hydroxyethyl)-5,5-dimethylhydantoin] and 0.003 part of titanium as titanium tetraisopropylate are melted together and slowly brought to 240° C. After commencement of the phenol formation, the temperature is raised to 270° C and the major part of the formed phenol is distilled off within 85 minutes. In the course of 15 minutes, a vacuum of 0.15 mm Hg is applied. The reaction is discontinued after a further 30 minutes. The formed copolyester is transparent and has the following properties:

| | |
|---|---|
| relative viscosity: | 1.26 |
| transition temperature ($T_g$): | 145° C |
| softening point ($T_e$): | 195° C |

A small amount of this copolyester is pulverised and the powder is spread out in a thin layer in a Teflon dish. The dish is heated under vacuum (0.1 mm Hg) for 30 hours at 220° C. The copolyester film formed is tough and has a relative viscosity of 1.58.

EXAMPLE 2

In a reactor provided with stirrer, $N_2$ inlet and distillation bridge, 9.54 parts by weight of DPT, 6.36 parts of DPI, 7.99 parts of bisphenol-A. 5.4 parts of 1,3-dihydroxyethyl-4,5,6,7-tetrachlorobenzimidazolone and 0.003 part of titanium as titanium tetraisopropylate are melted together and slowly brought to 240° C. After commencement of the phenol formation, the temperature is raised to 270° C, and the major part of the formed phenol is distilled off within 70 minutes. In the course of 15 minutes, a vacuum of 0.05 mm Hg is applied, and after a further 35 minutes the reaction is discontinued. The formed copolyester is transparent and has the following properties:

| | |
|---|---|
| relative viscosity: | 1.39 |
| transition temperature ($T_g$): | 143° C |
| softening point ($T_e$): | 200° C |

A small amount of this copolyester is pulverised and the powder is spread out in a thin layer in a Teflon dish. The dish is heated under vacuum (0.1 mm Hg) for 30 hours at 220° C. The copolyester film which has formed is tough and has a relative viscosity of 1.71.

EXAMPLE 3

In a reactor fitted with stirrer, $N_2$ inlet and distillation bridge, 9.54 parts of DPT, 6.36 parts of DPI, 0.59 part of dimerised fatty acid (Empol 1010, Unilever-Emery, Holland) 2.69 parts of 1,3-dihydroxyethyl-4,5,6,7-tetrabromobenzimidazolone, 10.27 parts of bisphenol-A and 0.003 part of titanium as tetraisopropylate are melted together and the melt is brought to 240° C. After commencement of the phenol formation, the temperature is raised to 290° C and the phenol distillation is continued. When the temperature has reached 290° C, a vacuum of 0.05 mm Hg is slowly applied, and after a further 40 minutes, the reaction is discontinued. The formed copolyester is amorphous and has the following properties:

| | |
|---|---|
| relative viscosity: | 1.45 |
| transition temperature ($T_g$): | 165° C |
| softening point ($T_e$): | 230° C |

In a thin-layer condensation stage, analogous to that in Examples 1 and 2, 300 g of this copolyester is condensed to a relative viscosity of 1.95, and the material is processed to give small standard test specimens. Testing according to DIN specification of these specimens gives the following values:

| | |
|---|---|
| impact strength (kg/cm/cm$^2$) | without fracture |
| impact strength (notched) (kp/cm/cm$^2$) | 22 |
| max. bending stress (kp/cm$^2$) | 1100 |
| modulus of elasticity (kp/cm$^2$) | 21000 |
| dimensional stability under heat (° C) | 150 |
| flammability | self-extinguishing |

EXAMPLES 4–11

The polyesters listed in Table 1 are produced according to Example 1.

Table 1

| Example No. | Composition (acids and diols) | Molar ratio | rel. | $T_G$ (°C) | $T_E$ (°C) |
|---|---|---|---|---|---|
| 4 | TPS+IPS+A+4,4-dihydroxy-diphenyl ether | 0,3:0,2:0,025:0,475 | 1.48 | 162 | 240 |
| 5 | TPS+IPS+A+1,5-dihydroxy-naphthalene | 0,3:0,2:0,0125:0,4875 | n.1. | 150 | 240 |
| 6 | TPS+IPS+C+resorcin | 0,3:0,2:0,0125:0,4875 | 1,36 | 133 | 185 |
| 7 | TPS+o-PS+BPA-dimeric acid | 0,2475:0,2475:0,5:0,005 | 1,30 | 150 | 195 |
| 8 | TPS+BPA+Ha B | 0,5:0,35:0,15 | 1,27 | 149 | 180 |
| 9 | TPS+IPS+BPS+C+Ha+A | 0,3:0,2:0,425:0,025:0,05 | 1,29 | 154 | 190 |
| 10 | TPS+BPA+C | 0,5:0,45:0,05 | 1,37 | 145 | 195 |
| 11 | TPS+BPA+D | 0,5:0,45:0,05 | 1,38 | 157 | 195 |

TPS = terephthalic acid
IPS = isophthalic acid
o-PS = o-phthalic acid
AG = ethylene glycol
B 14 = butanediol-1,4
BPA = bisphenol-A
A = 1,3-bis-(hydroxyethyl)-4,5,6,7-tetrabromobenzimidazolone
B = analogous tetrachloro compound to A
C = 1,1-methylene-bis-[3-(hydroxyethyl)-5,5-dimethylhydantoin]
D = 1,3-bis-(hydroxyethyl)benzimidazolone

EXAMPLES 12–15

Copolyesters are produced analogously to Example 1, processed into small standard test specimens (NKS) and the properties listed in Table 2 are determined.

Table 2

| Example No. | 12 | 13 | 14 | 15 |
|---|---|---|---|---|
| property test standard | DPT+DPI+BPA+E (0,3:0,2:0,475:0,025) | DPT+DPI+BPA+E (0,3:0,2:0,45:0,05) | TPS+JPS+BPA+B (0,285:0,19:0,475:0,025) +azelaic acid (0,025) | (0,285:0,19:0,475:0,025) +sebacic acid (0,025) |
| η rel (in standard small specimen) | 1,81 | 1,68 | 1,66 | 1,63 |
| impact DIN 53453 strength (cmkp/cm$^2$) | without fracture | without fracture | without fracture | without fracture |
| impact strength (notched) DIN 53453 (cmkp/cm$^2$) | 20,7 | 14,7 | 10,4 | 9,8 |
| dimensional stability (0°) under heat ISO/R75A | 157 | 144 | 144 | 145 |
| Limiting Oxygen Index | 33,5 | 34,5 | 35,2 | 35,1 |

E = N,N'-bis-(2-hydroxyethyl)-5,5-dimethyl-hydantoin

I claim:

1. A linear thermoplastic polyester, having a relative viscosity of 1.1 to 3.5 measured on a solution of 1 gram of polyester in 100 ml of a solvent consisiting of equal parts of phenol and symmetrical tetrachloroethane at 30° C, which comprises the condensation product in about a 1:1 molar ratio of diacids (a) and (a') with diols (b) and (c) so that the composition of the polyester comprises in the diacid component of the polyester (a) from 35 to 50 mol %, based on the total polyester, of radicals of aromatic dicarboxylic acids; and (a') from 15 to 0 mol %, based on the total polyester, of radicals of aliphatic dicarboxylic acids; and in the diol component of the polyester (b) from 25 to 49 mol %, based on the total polyester, of radicals of at least one aromatic diol, and (c) from 25 to 1 mol %, based on the total polyester, of radicals of at least one diol of the general formula I

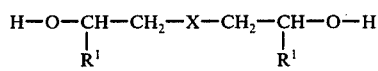  (I)

wherein $R^1$ represents a hydrogen atom, methyl, ethyl or phenyl, and X represents a radical of the formulae Ia to If

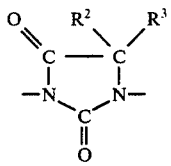 (Ia),

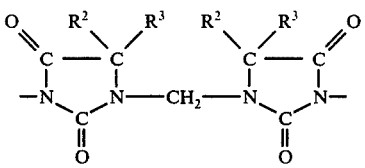 (Ib),

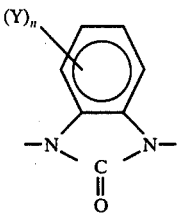 (Ic),

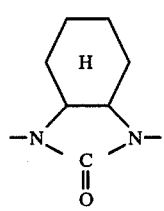 (Id),

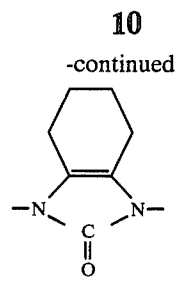 (Ie)

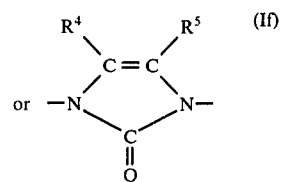 (If)

wherein $R^2$ represents a hydrogen atom, methyl or ethyl, $R^3$ represents methyl, ethyl, propyl or isopropyl, $R^4$ and $R^5$ represent phenyl which can be partially or completely chlorinated or brominated, and Y represents a chlorine or bromine atom, and $n$ represents nought or a number from 1 to 4; with the proviso that a portion of up to at most 10 mol % of the diol radicals of the formula I can be replaced by other aliphatic or cycloaliphatic diol radicals; and wherein the radicals (a) and (a') are attached to radicals (b) and (c) through ester linkages in a random distribution.

2. Polyester according to claim 1, characterised in that it contains 45 to 50 mol % of aromatic dicarboxylic acid radicals and 0 to 5 mol % of aliphatic dicarboxylic acid radicals.

3. Polyester according to claim 1, characterised in that it contains 35 to 47.5 mol % of aromatic diol radicals and 2.5 to 15 mol % of diol radicals of the formula I.

4. Polyester according to claim 1, characterised in that as aromatic dicarboxylic acid radicals there are contained terephthalic acid radicals, isophthalic acid radicals or a mixture thereof.

5. Polyester according to claim 1, characterised in that the aliphatic dicarboxylic acid radicals contain 4 to 36 C atoms.

6. Polyester according to claim 5, characterised in that it contains, as aliphatic dicarboxylic acid radicals, dimeric acid radicals or alkylsuccinic acid radicals having 6 to 22 C atoms in the alkyl group.

7. Polyester according to claim 1, characterised in that it contains, as aromatic diol radicals, 2,2-(p-hydroxyphenyl)-propane radicals or 1,1-(p-hydroxyphenyl)-cyclohexane radicals.

8. Polyester according to claim 1, characterised in that it contains, as aliphatic diol radicals, alkylene diols having 2 to 12 C atoms.

9. Polyester according to claim 1, characterised in that in the diol radicals of the formula I, $R^1$ represents a hydrogen atom, and X represents a radical of the formulae Ia to Ic.

10. Polyester according to claim 1, characterised in that in the formulae Ia and Ib, $R^2$ represents methyl, and $R_3$ represents methyl or ethyl.

11. Polyester according to claim 1, characterised in that in the formulae Ic, $n$ is 0 or represents the number 4.

12. Polyester according to claim 8 wherein the aliphatic diol radicals are of 2 to 6 C atoms.

* * * * *